United States Patent [19]

Corona

[11] 4,102,624
[45] Jul. 25, 1978

[54] ROTATIONAL MOLDING APPARATUS

[75] Inventor: Peter J. Corona, Marina Del Rey, Calif.

[73] Assignee: Windsurfing International, Inc., Marina Del Rey, Calif.

[21] Appl. No.: 732,267

[22] Filed: Oct. 14, 1976

[51] Int. Cl.² .............................................. B29C 5/04
[52] U.S. Cl. .................. 425/429; 425/435; 425/454; 264/311
[58] Field of Search ............... 425/429, 430, 434, 435, 425/454; 264/311, 310

[56] References Cited

U.S. PATENT DOCUMENTS

| | | | |
|---|---|---|---|
| 3,112,529 | 12/1963 | Chupa | 425/430 |
| 3,337,662 | 8/1967 | Spencer | 425/429 X |
| 3,799,729 | 3/1974 | Hagen | 425/430 X |
| 3,822,980 | 7/1974 | Graeper | 425/429 |
| 3,829,272 | 8/1974 | Cavillon et al. | 425/435 X |

Primary Examiner—Robert L. Spicer, Jr.
Attorney, Agent, or Firm—Nilsson, Robbins, Dalgarn, Berliner, Carson & Wurst

[57] ABSTRACT

An apparatus and process is disclosed for rotational molding. Rotational molding is a technique for the fabrication of parts from powdered thermoplastic material in which the thermoplastic material is placed within a hollow mold and the mold is rotated in a heated environment until the thermoplastic material fuses and coats the entire interior surface of the mold. Included in the apparatus is a holding mechanism for the mold and a power mechanism to provide the required rotational motion to the mold. The power mechanism provides for simultaneous rotation of the mold about two orthogonal axes and is displaced spatially from the holding mechanism. The holding mechanism is attached to a translating mechanism which positions the molds both internal to and external to a heating chamber such as an oven while keeping the drive mechanism external of the oven at all times.

More specifically there is disclosed an apparatus which includes a truck mounted upon a guiding track and having extending therefrom an arm mechanism. The arm is pivotally attached to the truck and is coupled thereto in such a manner that the arm may be translated about the pivotal point through a vertical path from a horizontal position at a loading/unloading (mold rework) station through approximately 180° to be positioned into a heating chamber at a heating station and a cooling chamber or tower at a cooling station for fabrication of the molded part. Subsequently, thereto the mold attached to the arm may be repositioned at the mold rework station for the removal of the plastic part from the mold. Automatic control mechanisms and interlocks are provided to enable safety measures to be exercised to prevent movement of the truck along the track except at specified times and when the arm is in appropriate position to clear the oven and cooling towers.

16 Claims, 17 Drawing Figures

ROTATIONAL MOLDING APPARATUS

BACKGROUND OF THE INVENTION

Rotational molding is a process for the fabrication of parts from powdered thermoplastic material. A split mold is utilized, the two halves of which are clamped together after the proper amount of powdered thermoplastic material has been inserted therein. The mold then is heated while being simultaneously rotated about two axes at right angles to each other. During the heating and rotation cycle the hot thermoplastic material fuses together forming a homogeneous layer contoured to the surface of the mold. The duration of and temperature during the heating cycle as well as the frequency and characteristics of the rotation about each axis are important variables in determining the quality of the molded plastic part and are usually empirically determined.

Rotational molding devices traditionally consist of a heating chamber, a cooling chamber, a holding mechanism for the molds, and a drive mechanism for rotating the molds simultaneously in orthogonal axes. The apparatus disclosed herein utilizes the functional elements above but incorporates unique structure for rotating the molds and translating the molds into desired positions. With this unique structure, a process of rotational molding is disclosed which was heretofore not possible.

Prior art rotational molding apparatus traditionally consists of machinery having separate arms extending therefrom and spaced 120° apart. Also included is a heating chamber, a cooling chamber and a mold rework station. Drive motors rotate the arms, which are traditionally horizontally disposed, so that one arm is positioned within each of the chambers and the mold rework station at a time. Spiders carrying mold halves are attached at the exterior of the arms and a power driving mechanism is included to rotate the spiders and thus the molds attached thereto simultaneously about a major axis aligned with the longitudinal axis of the arm and a minor axis disposed orthogonally to the major axis. In many instances all or part of the power drive mechanism is located in such a position that it may be subjected to the adverse environmental conditions extant in the oven and the cooling chambers. Alternatively the orthogonal rotation is obtained in some prior art devices by rocking the spiders in one direction while rotating in the orthogonally disposed direction or axis.

It will become apparent to those skilled in the art that sufficient clearance must be provided both above and below the longitudinal axis of the arms supporting the spiders to provide for proper dual axis rotation of the molds. As a result, the arms are usually raised a substantial distance above the ground or floor level where the machinery is installed or, alternatively excavation is required at the stations where the rotation occurs. In either event added cost for installation of the equipment results and typically the positioning of the mold rework station is such that mold rework becomes a complicated, time consuming and thus expensive operation.

SUMMARY OF THE INVENTION

The unique structure disclosed herein consists of a mold holding mechanism, a drive means for rotating the holding mechanism about two axes, a support structure or truck to which the holding mechanism and power source are mounted, and a means for translating the holding mechanism through a vertical path from a position wherein the holding mechanism is external to an oven to a position wherein the holding mechanism is internal to the oven while maintaining the power source external to the oven at all times.

The translating means includes a pair of spaced apart pivot points which permits the holding mechanism to be effectively folded upon itself. Such structure places the molds at a first level during the time they are being charged with plastic material and unloaded with the molded part and in a different, and elevated, position during the time the molds are being heated and cooled while being simultaneously rocked and/or rotated.

In accordance with a more specific aspect of the present invention, the holding means includes a pair of arms between which a mold support bar is rotatably affixed. A spider holding the molds to be rotated is then mounted upon the bar. At least one of the arms is hollow and carries a drive shaft through the hollow interior thereof into driving engagement with the bar. The arms are in turn pivotally supported upon a truck means which includes a drive means which rocks the entire holding means about one axis, while simultaneously through the drive shaft and a gear assembly disposed within the hollow arm, causes the molds to rotate about the axis orthogonal to the one axis and at a rate independent of that of the rocking rate. In the particular embodiment described, the holding means rocks or reciprocates through a plus and minus 45° arcuate angle while the molds attached to the hollow arms are continuously rotated in one direction. The arms in the preferred embodiment are in the shape of a wishbone or forked boom with the two arms coming together to form a "Y" and the single leg of the "Y" connected to a drive means which in turn is connected to the power source.

The drive means consists of two elements, a first means for rocking the entire "Y" structure and a second means for rotating the shaft disposed in the hollow arm of the "Y". Thus both the drive means and the power source are completely separated and displaced from the holding mechanism and interfaces with it only at the terminal end of the single leg of the "Y" shaped holding mechanism, herein referred to as the third leg. The terminal end of the third leg is pivotally coupled to the truck whereby the "Y" shaped holding mechanism may be pivoted with respect to the truck about an axis that is substantially perpendicular to the floor or base upon which the truck is positioned thereby translating the molds through a vertical path. It is this unique feature that allows the "Y" shaped holding mechanism to be translated from a mold rework station position into an oven or cooling chamber position while the drive means always remains external.

When the holding mechanism, drive means, and translating means are mounted on a moveable base (the truck), a process for rotational molding can then be utilized in which the molds are attached to the holding mechanism, the holding mechanism translated through a vertical path into the oven with the drive means remaining external to the oven, the holding mechanism translated out of the oven at the end of the heating and fusing cycle, the entire structure moved to a cooling chamber, and the holding mechanism similarly translated through a vertical path into and out of the cooling chamber.

DESCRIPTION OF THE PREFERRED EMBODIMENT

An apparatus and process is disclosed for rotational molding, a type of plastic molding wherein thermoplastic resin is fused by coming in contact with the interior surface of a hot, hollow, and constantly rotating mold. The invention can be best visualized by referring to FIGS. 1, 2, 2A, and 3 which illustrate the apparatus in various phases of operation.

Figure 1:
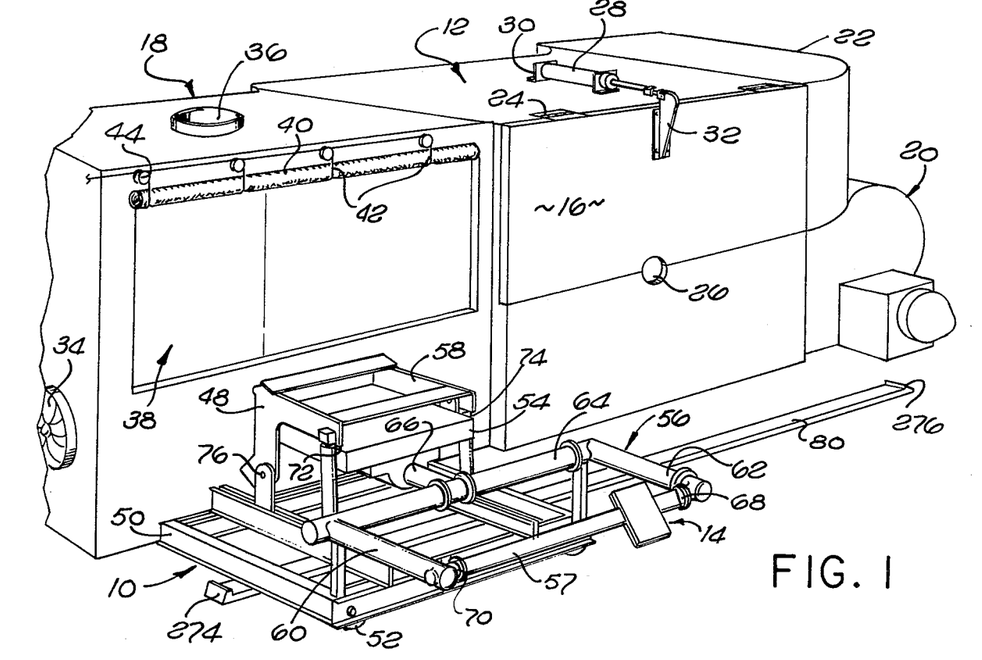
FIG. 1 is a simplified schematic illustration showing apparatus constructed in accordance with the present invention in the mold rework position.

FIG. 1 illustrates a truck or cart 10 in the mold rework position, that is the unloading, recharging and loading position. In this position an operator standing at ground level may perform all operations needed with respect to a mold 14. Typically spiders holding the mold 14 may be attached to the apparatus, the mold 14 may be charged or recharged with granular thermoplastic material, the molded part may be removed from the mold 14, or the mold exchanged for other molds. An important aspect of the present invention is that the mold 14 is positioned as required for the operator to perform these functions without the necessity of construction of special platforms, excavations or other apparatus to accommodate the operator or the mold 14.

Figure 2:
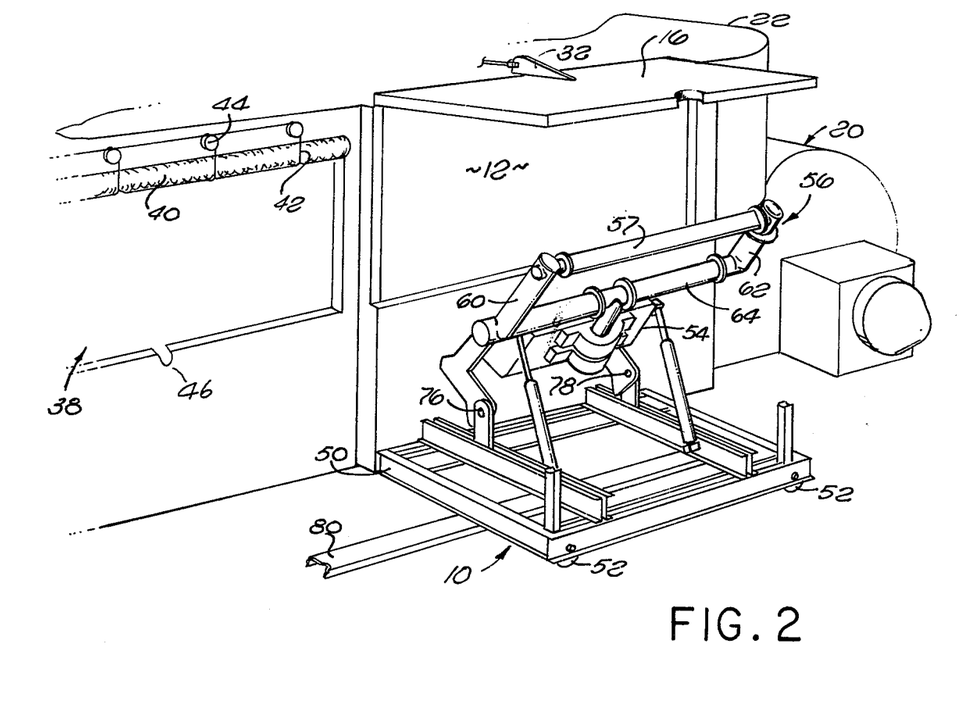
FIG. 2 and FIG. 2A are simplified schematic illustrations showing the apparatus at the oven or heating chamber position with the holding mechanism and molds being pivoted and translated into the oven.

After the mold 14 is charged with the required amount of thermoplastic material, the truck 10 is then moved to a position directly in front of a heating chamber such as the oven 12 as shown in FIG. 2. From this position the mold 14 is pivoted through a vertical path into the oven 12. The oven door 16 is then closed and heat is applied to the mold 14 while the mold is simultaneously rocked and rotated as explained in detail below.

It will be noted that the mold 14 in being translated from the mold rework station into the oven 12 has been elevated substantially. As will be described more in detail hereinbelow the utilization of a pair of spaced apart pivot points in the structure attaching the mold 14 to the truck 10 effects such elevation. This elevation eliminates the necessity for excavation or special platforms to accommodate easy access to the molds at the mold rework station while allowing the rocking motion thereof during residence thereof in the heating chamber or oven 12.

Figure 3:
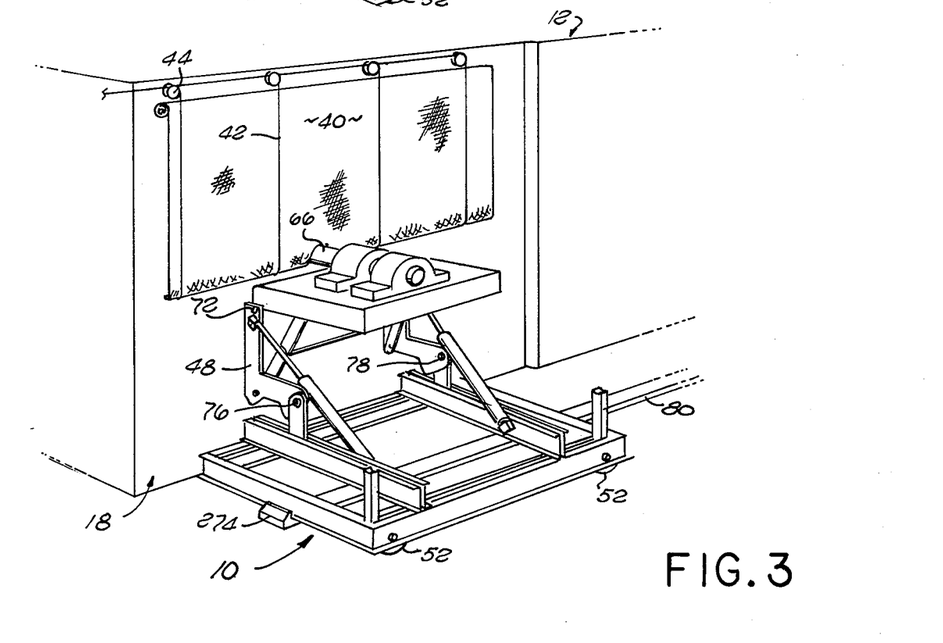
FIG. 3 is a simplified schematic illustration showing the apparatus after the holding mechanism has been translated into the cooling chamber.

Upon completion of the heating cycle, the oven door 16 is opened and the mold 14 pivoted through a vertical path to a postion such that the oven structure is cleared. The truck 10 is then moved to a position directly in front of the cooling chamber such as the cooling tower 18 and the mold 14 is then pivoted through a vertical path into the cooling tower 18 as shown in FIG. 3. Upon completion of the cooling cycle the mold 14 is then pivoted through a vertical path to the original mold rework position shown in FIG. 1 for easy unloading of the molded part. The process can then be started over again. The following description discloses the structure that makes the operation above described possible.

BASIC APPARATUS

The basic apparatus consists of an oven 12, a cooling tower 18 and a truck 10 which is manipulatable between the oven 12 and the tower 18.

THE OVEN

Referring to FIG. 1, the oven 12 includes a heating and blowing assembly 20, exhaust port 22, door 16 which is pivotally mounted at the top with hinges 24, and an aperture 26 through which a portion of the apparatus can extend as further explained in detail. The door 16 pivots upward and out with respect to the oven enclosure, and is raised by a hydraulic lift 28 secured between a mounting bracket 30 on the oven 12 and a lifting bracket 32 secured to the door 16. Referring to FIG. 2, when the hydraulic lift 28 is actuated the piston therein retracts the rod connected to the bracket 32 thus causing the door 16 to raise. The oven 12 is heated by hot air from the heating and blowing assembly 20 which utilizes natural gas. The hot air is also captured at the exhaust 22 and recirculated as will be appreciated by those skilled in the art. Other means for oven heating such as electricity, coal, oil, etc., could also be utilized.

COOLING TOWER

Referring again to FIG. 1, the cooling tower 18 utilizes a fan 34 which forces outside ambient air through the tower and out the exhaust port 36, thus lowering the temperature of the hot mold 14 during the time it is positioned within the cooling tower 18. Other methods of cooling such as the use of refrigerated air or water spray could also be employed separately or in conjunction with the fan 34. An opening 38 into the cooling tower 18 may be covered with a canvas sheet 40 by by unwinding ropes 42 which are wound on an electrically operated take-up spool 44. Reversing the direction of the take-up spool 44 causes the ropes 42 to raise the canvas sheet 40, thus creating the opening 38. In addition an indentation 46 is provided for the same purpose as the aperture 26 as explained above.

THE TRUCK

The truck 10 includes a base 50 mounted upon wheels 52. A pivoted load bearing platform 54 carries a wishbone shaped boom 56 and is pivotally affixed to a pair of L shaped brackets 48 and 58 which are pivotally attached to the base 50. Appropriate spiders containing the molds 14 may be connected to the mold support bar 57 secured to the wishbone boom 56 for appropriate manipulation as above described. The wishbone boom 56 includes two hollow, tubular arms 60 and 62 which are rigidly connected to a third arm 64 the center of which is rigidly attached to an extension 66. Extension 66 interfaces with a driving mechanism in a manner to be explained in detail below. The mold support bar 57 to which a spider to which the mold 14 is mounted is connected to a rotatably mounted bracket 68 at the end of the arm 62 and an idler gear 70 at the end of the arm 60. Drive shafts and appropriate gearing (to be explained in detail herein below) are provided within the extension 66 and the arms 64 and 62 which cause the bracket 68 and therefore the mold 14 to rotate. The extension 66 and the arms 60, 62 and 64 combination is herein referred to as the holding mechanism.

As will be apparent to those skilled in the art, if the molds to be used are small in size and two arms are not required for support thereof, then a single hollow arm may be substituted and, for example, would be merely a continuation of hollow extension 66 with the appropriate drive shaft and gearing supported interior thereof.

Figure 6:
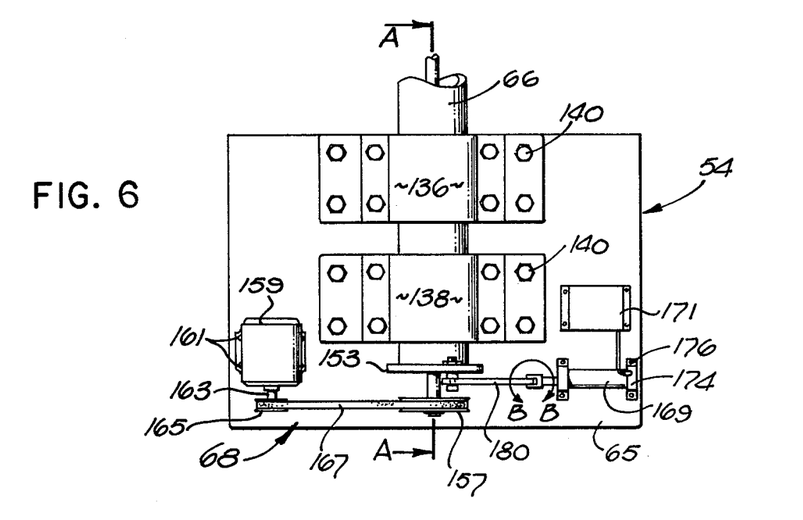
FIG. 6 is a top elevational view of a fragmentary portion of the apparatus illustrating the interconnection between the holding mechanism, the drive mechanism, and the power source.

The drive mechanism as shown in FIG. 6 is attached to the platform 54 which is pivotally connected at the points 72 and 74 to the two L-shaped support brackets 48 and 58 respectively. These brackets are in turn connected pivotally to the base 50 at pivot points 76 and 78 (FIG. 2) respectively. The base 50 has a roller 52 at each of its four corners. Through use of the rollers 52, the truck 10 can be readily moved between the cooling tower 18 to the oven 12 on a path determined by the location of a guidance track 80.

An overview of the operation is as follows. From the mold rework position shown in FIG. 1 the L-shaped brackets 48 and 58 are pivoted counterclockwise 90° (as viewed from the left in FIGS. 1–3) about pivot points 76 and 78 through a vertical path such that the arms 60 and 62 are in a vertical position. At that point the platform 54 is rotated counterclockwise 90° about the pivot points 72 and 74 such that the arms 60 and 62 are again horizontal but rotated 180° from their original load position and translated upward with respect to the base 50. Proper operation of the apparatus requires that the truck 10 be positioned such that at the completion of the above-described sequence the extension 66 fills the space defined by aperture 26 or indentation 46, thus resulting in the holding mechanism being internal to the enclosure and the driving mechanism attached to the platform 54 being external to the enclosure.

DETAILED DESCRIPTION

Platform Translation Mechanism

Figure 2A:
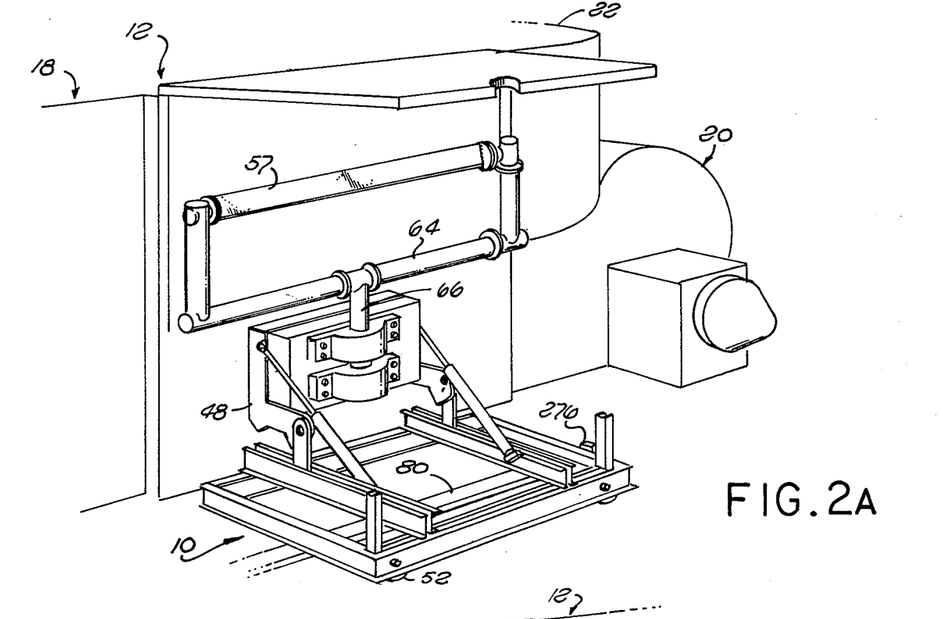
Figure 4:
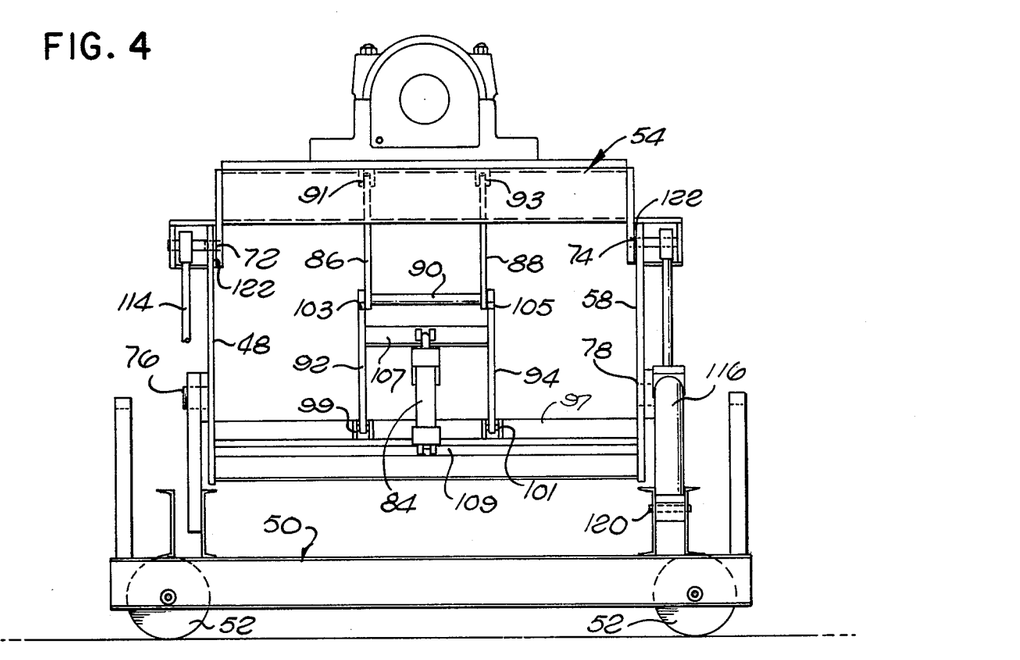
FIG. 4 is a front elevational view of a portion of the truck mechanism illustrating the various linkages and power sources for pivoting the holding mechanism and translating the same through vertical paths into the various stations.
Figure 5:
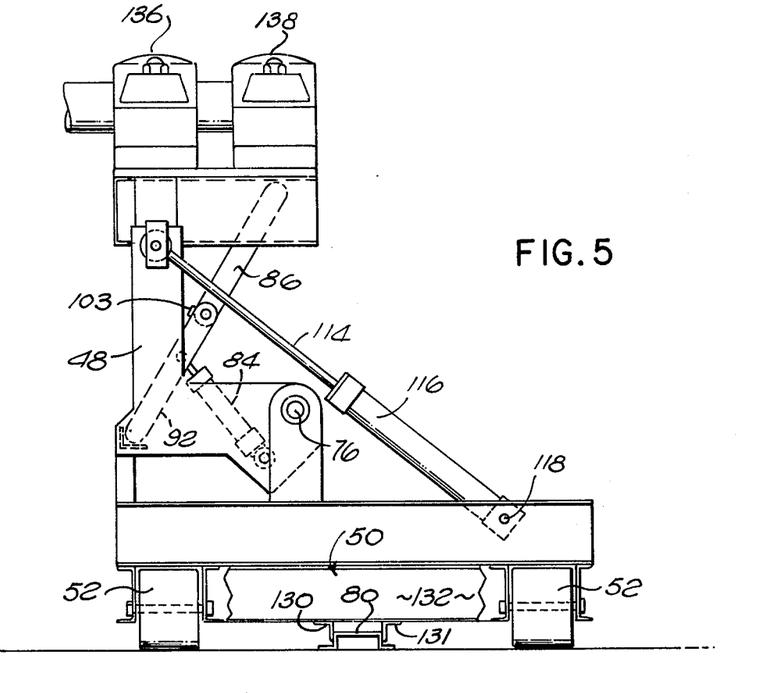
FIG. 5 is a side elevational view of the apparatus illustrated in FIG. 4.

Turning now to details of the apparatus, FIGS. 4 and 5 show a front elevational and left side view of the truck 10 with the platform 54 in the fully extended position, a position that corresponds to that shown in FIG. 3. The platform 54 as previously explained pivots about pivot points 72 and 74. Movement is effected by extension or retraction of a hydraulic lift 84. Linkage arms 86 and 88 are pivotally attached between a metal pin 90 and the platform 54 at the points 91 and 93. Linkage arms 92 and 94 are also pivotally attached between the metal pin 90 and the rear cross-beam 97 at points 99 and 101, respectively. Overcenter locking is accomplished by the protrusions 103 and 105 when the hydraulic lift 84 is in the fully retracted position. The piston of hydraulic lift 84 is pivotally attached to cross member 107. The cylinder is pivotally attached to cross rod 109. As hydraulic lift 84 is extended, the linkages 86, 88, 92 and 94 pivot upward about the various pivot points until the surface 55 of the platform 54 is in the vertical position, as shown in FIG. 2A. Similarly, when the hydraulic lift 84 is retracted the linkages pivot about the various pivot points which exert an upward movement to the platform 54 through which in turn causes rotation about the pivot points 72 and 74 until the position shown in FIG. 3 is reached.

Thus the platform with the holding mechanism supported thereon is elevated to a position which accomodates a rocking of the arms 60–62 between the desired angles as previously generally discussed.

It will now be recognized by those skilled in the art that through actuation of the hydraulic lift 84 the platform 54 is translated from a position where the holding mechanism is disposed vertically to a position where the holding mechanism is disposed horizontally but in the oven or the cooling tower. It will also be recognized that the platform 54 cannot be translated, i.e., the lift 84 cannot be actuated, unless the remainder of the apparatus is as illustrated in FIGS. 4 and 5.

With the platform 54 in the fully retracted position, i.e., with the hydraulic lift 84 fully extended, the L-shaped supports 48 and 58 can be pivoted such that the surface 55 of the platform 54 will be horizontal and facing downward as shown in FIG. 1. Translation is accomplished through two other hydraulic lifts 114 and 116 which are pivotally attached to the base at points 118 and 120 and to the L-shaped supports 48 and 58 at pivot points 72 and 74, respectively. Thrust washers 122 are provided between the rotating surfaces. When the hydraulic lifts 114 and 116 retract, the L-shaped supports 48 and 58 pivot about points 76 and 78. Since the platform 54 and its associated structure are attached to the L-shaped supports 48 and 58, as the supports 48 and 58 rotate a corresponding translation occurs in the platform 54. As the hydraulic lifts 114 and 116 continue to retract, the L-shaped supports 48 and 58 continue to pivot until retraction is complete. In this position the surface of the platform 54 is horizontal with surface 55 facing downward as viewed in FIG. 1. The reverse process occurs when the hydraulic lifts 114 and 116 are extended, thus causing the L-shaped supports 48 and 58 to pivot until they abut the rear cross-beam 97.

GUIDE MECHANISM

Movement of the truck 10 along a prescribed path is accomplished by four rollers 52, one of which is at each corner of the base 50. A guide structure mounted on base 50, includes two L-beams 130-131 which extend longitudinally along the bottom of the truck 10 and are welded to the cross bars 132. The sides of the L-beams 130-131 extend below the top of a guidance track 80 secured to the floor, thus ensuring that as the truck 10 is rolled, it will follow the path determined by the placement of the guidance track 80.

DRIVE MECHANISM

FIG. 6 illustrates the drive mechanism that provides rotation and rocking motion to the molds. Various elements of the drive mechanism are attached to the upper surface of platform 54 including roller bearing holding fixtures 136 and 138 which are attached by bolts 140. Extension 66 is a hollow tube with a flange at one end and it is supported by the two roller bearing holding fixtures 136 and 138 which allow it to freely rotate therein.

Figure 6A:
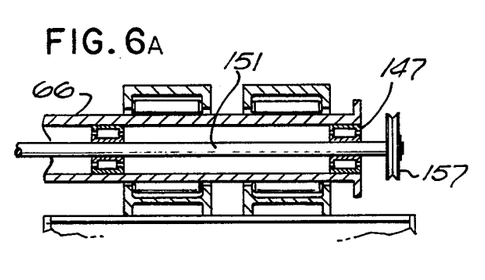
FIG. 6A is a cross sectional view taken about the lines A—A of FIG. 6 illustrating the manner in which the holding mechanism is mounted and the drive mechanism is disposed internally thereof.

Referring to FIG. 6A, a roller bearing assembly 147 is pressed into the end of the extension 66. This roller bearing assembly supports a drive shaft 151 and allows it to rotate independent of the member 66. A pulley 157 is mounted on the end of the drive shaft 151. As can be seen in FIG. 6, an electric motor 159 is attached to the surface of the platform 54 by the bolts 161. The shaft 163 of the electric motor 159 is fitted with a pulley 165. A belt 167 connects the pulley 165 with the pulley 157. Thus operation of the electric motor 159 through the structure described above causes the drive shaft 151 to rotate.

Figure 6B:
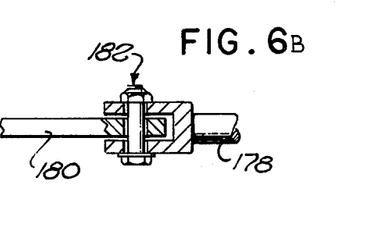
FIG. 6B is a cross sectional view of the detail within circle B—B of FIG. 6 illustrating the interconnection between the power source and the drive mechanism for rocking the holding mechanism.

Rocking motion of the extension 66 is accomplished with a hydraulic actuator 169 that is powered by an electrically driven pump 171 attached to the platform 54 by bolts. The hydraulic actuator 169 is rigidly clamped by holding fixtures 174 which are also attached to the mounting fixture 65 with bolts 176. The piston arm 178 of the hydraulic actuator 169 is attached to a driving arm 180 as detailed in FIG. 6B. As can be seen, the end of the piston arm 178 is formed as a clevis which is used for attachment to the driving arm 180. The actual attachment is effected with nut, bolt, and washer assembly 182.

Figure 7:
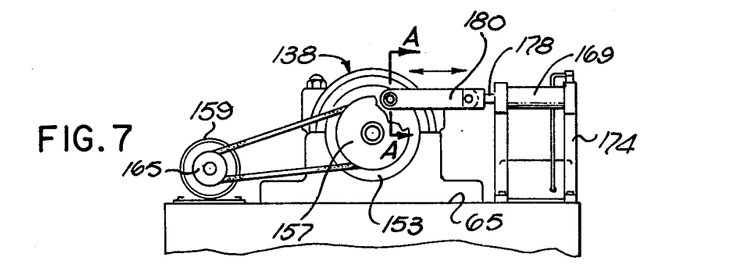
FIG. 7 is a front elevational view of the structure illustrated in FIG. 6.
Figures 7A, 8:
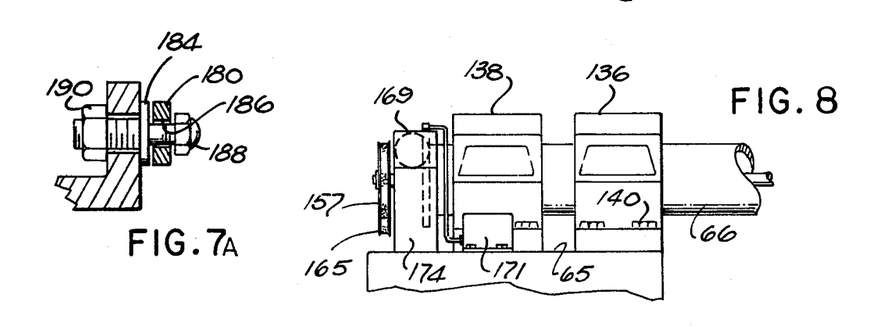
FIG. 7A is a cross sectional view taken about the lines A—A of FIG. 7 and illustrating the connection to the rocking drive means disposed on the holding mechanism.
FIG. 8 is a side elevational view of the structure illustrated in FIG. 6.

A driving arm 180 is rotatably attached to a flange 153 formed at the end of the extension 66 as detailed in FIG. 6A. A lug 184 is positioned in a hole provided in the flange 153. The driving arm 180 defines an opening within which is received a bushing 186 which mates with the lug 184. The lug 184 is fitted with a cap 188 and the assembly is secured by a nut 190. Thus as pressure is sequentially applied to each side of the hydraulic actuator 169, the piston arm 178 thereof sequentially extends and retracts and through the driving arm 180 and the lug 184 results in the extension 66 reciprocally rotating counterclockwise and then clockwise as viewed in FIG. 7. The length of the driving arm 180 and position of the hydraulic actuator 169 are chosen such that the angle formed between the lug 184 and the center of the drive shaft 151 varies between approximately plus and minus 45° from the vertical as the piston arm 178 alternates between the fully extended and fully retractd positions. Obviously, the degree of rocking is fully adjustable between the limits desired.

Thus as can be seen from the preceding description, the drive mechanism is capable of providing a plus and minus 45° rocking motion to the extension 66 while at the same time and independently providing a continuous rotating motion to the drive shaft 151. Another feature of the drive mechanism is that the rocking frequency of the extension 66 is completely independent of the drive shaft 151 rotation frequency and each can be controlled separately through the hydraulic actuator 169 and the electric motor 159, respectively. In this particular embodiment the extension 66 rocks between 2 and 10 cycles per minute and the drive shaft 151 rotates between 10 and 50 revolutions per minute. However any speed could be effected depending upon the size of the particular article being molded and the setting of the variables in the molding process such as materials, temperatures and times.

HOLDING MECHANISM

Figure 9:
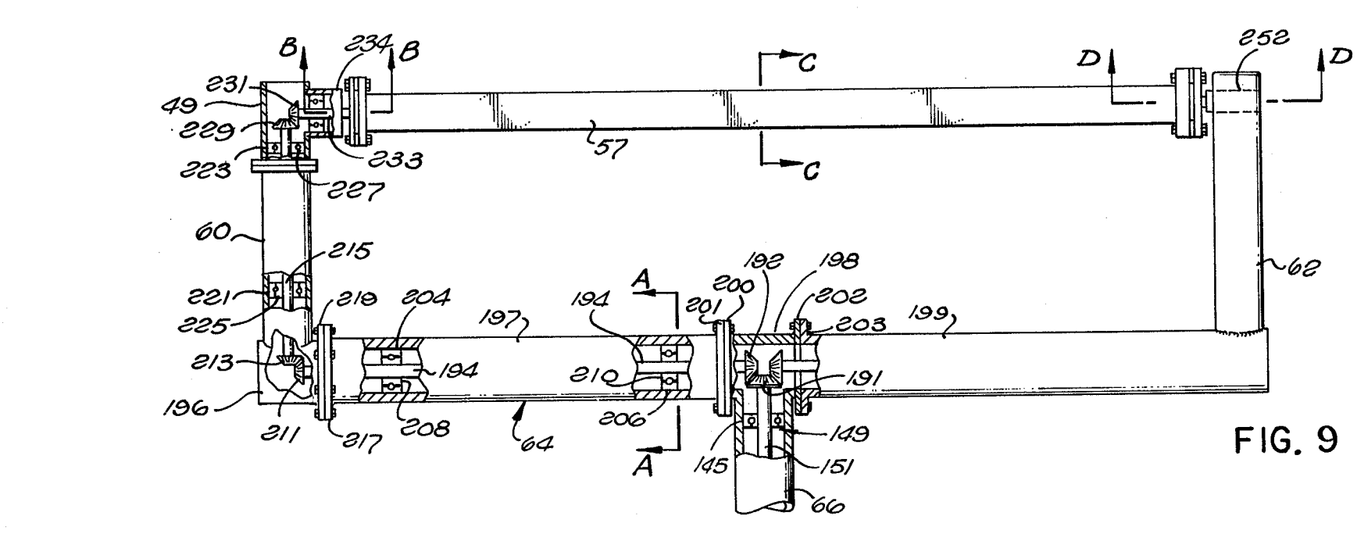
FIG. 9 is a top elevational view of the holding mechanism with portions thereof broken away to illustrate internal details of construction.
Figure 9A:
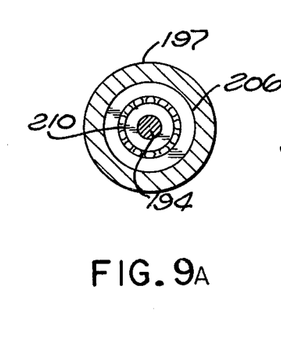
FIG. 9A is a cross sectional view taken about the lines A—A of FIG. 9 and illustrating the drive shaft positioned within a hollow arm of the holding mechanism.

The holding mechanism is shown in further detail in FIG. 9. Drive shaft 151 is supported by a circular member bearing support 145 and bearing assembly 149 as previously described. The end of drive shaft 151 is fitted with a 45° mitered gear 191 which meshes with a second 45° mitered gear 192 fitted on the end of a shaft 194. Tubular segments 196, 197, 198 and 199 comprise arm 64 as shown in FIG. 1. The extension 66 is welded to tubular segment 198. Segment 198 has flanges 200 and 202 which bolt to flanges 201 and 203 on the segments 197 and 199, respectively. Circular bearing support members 204 and 206 are fitted with roller bearing assemblies 208 and 210 which support the shaft 194 as illustrated in detail in FIG. 9A. The end of the shaft 194 is fitted with a 45° mitered gear 211 which meshes with another 45° mitered gear 213 fitted on the shaft 215. Segment 196 bolts to the segment 197 via the flanges 217 and 219. Arm 60 attaches to the segment 196 in the same manner as extension 66 attaches to segment 198 as explained above. Bearing support members 221 and 223 and bearing assemblies 225 and 227 support the shaft 215 in the same manner as the shaft 194 is supported as detailed in FIG. 9A. The end of shaft 215 is fitted with a 45° mitered gear 229 which meshes with another 45° mitered gear 231 fitted to a shaft 233. Tubular segment 234 is attached to the arm 49 in the same manner as the arm 60 is attached to segment 196 as explained above.

Figure 9B:
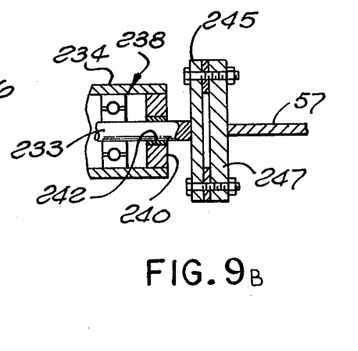
FIG. 9B is a cross sectional view taken about the lines B—B of FIG. 9 and illustrating the drive shaft connection to the spider holding member.
Figure 9C:
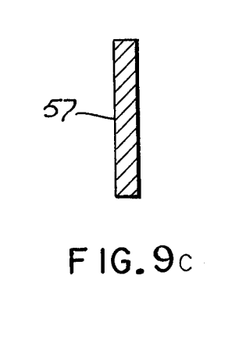
FIG. 9C is a cross sectional view taken about the lines C—C of FIG. 9 and illustrating the spider-mold construction.

Referring to FIG. 9B, shaft 233 is supported by the support member and bearing assembly 238. Segment 234 is sealed by a circular end cap 240, in the center of which is a bushing 242 which provides sealing and support to the shaft 233. Attached to the end of the shaft 233 is a circular mounting plate 245. Bar 57 is rectangular in shape as shown in FIG. 9C and is fitted with circular mouting plates 247 and 249 at each end. Plate 245 bolts to plate 247 as shown. Appropriate spiders which support mold halves are attached to the bar 57 as well known to the art.

Figure 9D:
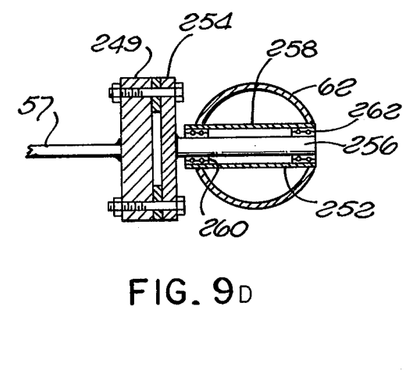
FIG. 9D is a cross sectional view taken about the lines D—D of FIG. 9 and illustrating the idler construction.

Tubular segment 199 attaches to segment 198 via flanges 203 and 202 and to arm 62 in the same manner as arm 60 attaches to segment 196 as explained above. The end of arm 62 is fitted with an idler 252, the details of which are shown in FIG. 9 D. As can be seen, circular mounting plate 249 is bolted to the plate 254 which is attached to idler shaft 256. The idler housing 258 contains bearing assemblies 260 and 262 which provide support for shaft 256 and allow it to freely rotate.

As will be appreciated by those skilled in the art the holding mechanism described discloses an apparatus whereby rotational energy applied to drive shaft 151 is transmitted through shafts 194, 215 and 233 to the fixture 57. The rotating of the bar 57 is effected regardless of changes in the angular position of extension 66. Therefore bar 57, and any attached molds, can be rocked through plus and minus 45° while at the same time continuously rotating. These simultaneous movements are achieved through a mechanism whose only interface with the driving mechanism is a tubular segment represented herein as extension 66. In addition, the entire drive mechanism is external to the oven 12 and the cooling tower 18 internal operating environments.

OPERATION

Referring again to FIG. 1, truck 10 is shown at the mold rework station. Here the operator can readily attach the mold 14 to the bar 57 by any convenient means such as clamping, bolting, etc. Typically a pair of spiders are attached to the bar and the spiders carry half mold sections which are clamped together as is well known to those skilled in the art. The truck 10 is then moved to the heating chamber or oven position with its path being determined by the guidance track 80. A stop 276 at the end of the guidance track 80 allows the truck 10 and thus the extension 66 to be positioned precisely with respect to the aperture 26. The truck 10 could be moved manually or powered with an internal motor activated by a manual switch. If the latter, than an interlock should be supplied which would prevent the motor from being activated until the holding mechanism is either in a vertical or load position, thus preventing damage to either the oven 12, the molds, the cooling tower 18, or other adjacent structure.

Referring now to FIG. 2, the oven door 16 is opened in the manner previously explained. An interlock is provided which prevents the oven door from opening or closing unless the holding mechanism is in a horizontal position whenever truck 10 is positioned in front of the oven 12. The holding mechanism and the drive mechanism are then first rotated into a vertical position and then into a horizontal position by the apparatus previously described in the Platform Translation Mechanism section hereof. In this position the holding mechanism is internal to the oven 12, extension 66 is positioned in aperture 26, and the drive mechanism is external to the oven. At this point electric motor 159 is started which results in the rotation of arm 57 and the molds attached thereto. Obviously rotation of the molds may be started at any time after charging thereof. Hydraulic actuator 169 is also now activated which in the manner previously explained imparts a plus and minus 45° rocking motion to arm 57 and the molds thereon. At this point the door 16 is closed, heating is supplied to the oven 12, and the driving mechanism continues to operate until the appropriate molding time has elapsed. At this time the hydraulic actuator 169 is stopped and the door 16 opened. The hydraulic actuator 169 is then positioned such that the arm 64 of the holding mechanism is horizontal. At this point the holding mechanism and the drive mechanism 68 are rotated back to a point such that they clear the oven structure. The truck 10 is then moved back along the guidance track 80 until further movement is prevented by the stop 274. Again the stop is located such that the truck 10 and thus the extension 66 are positioned precisely with respect to indentation 46. A limit switch is provided in conjunction with canvas sheet 40 which will prevent the holding mechanism from moving from a vertical to a horizontal position until canvas sheet 40 is in the fully retracted position. The holding mechanism is again rotated counterclockwise until it is internal to the cooling tower 18 and the drive mechanism 68 is external thereof. During the transfer from the oven 12 to the cooling tower 18 the electric motor 159 continues to operate and bar 57 and the molds attached thereto continue to rotate. The canvas sheet 40 is then lowered by the electrically driven take-up spool 44 and the fan 34 is turned on as shown in FIG. 3. When cooling is complete, the take-up spool 44 retracts the canvas sheet 40 and the driving mechanism is turned off. The holding mechamism is then rotated back to the position shown in FIG. 1 where the mold 14 can be easily opened and the part removed.

Although the various stages of the sequence as described above were detailed as separate steps, the entire sequence subsequent to charging the mold 14 and prior to unloading the part from the mold 14 could be made automatically by utilizing appropriate timing, sensing and interlock devices. For example, a second embodiment of the invention provides for the truck 10 to be motorized such that after attaching the mold 14, initiation of the cycle would result in the truck 10 automatically proceeding along the path dictated by the guidance track 80. Upon reaching the stop 276, the guide structure 130 would activate a switch mounted on the stop 276 which would deactivate the propelling device in the truck 10. Similarly, by sensing the position of the oven door 16, on/off status of oven heating and the blowing assembly 20, position of the platform 54 and on/off status of the driving mechanism, angular position of the extension 66, position of the canvas sheet 40, and on/off status of the fan 34, through logic circuitry well known in the process control art, each of the above described steps could be accomplished automatically by sending the appropriate start and stop signals to the various control elements based upon the status of the above listed indicating devices. As would also be recognized, separate programs for different parts may be utilized on conjunction with appropriate electronic control devices to allow rapid and efficient molding of various parts.

Thus a rotational molding apparatus has been described which provides for molds to be placed internally of a heating or cooling enclosure with the molds being simultaneously rocked and rotated about two axes by a centrally disposed driving mechanism external to the heating or cooling enclosure. In addition, the driving mechanism and mold holding mechanism can be pivoted so as to allow easy loading and unloading of the molds.

I claim:
1. A rotational molding apparatus which comprises:
 a. a holding mechanism for receiving a mold;
 b. a drive means for imparting rotational motion to said holding mechanism;
 c. a support structure;
 d. pivot means for attaching said holding mechanism and said drive means to said support structure;
 e. an oven; and
 f. means for rotating said holding mechanism and said drive means about said pivot means along a vertically disposed plane from a position wherein said molding mechanism and said drive means are external to said oven to a position wherein said molding mechanism is internal of said oven and said drive means is external to the oven.

2. The apparatus of claim 1 wherein the holding mechanism comprises:
   a. a rotatably mounted extension which engages with said drive mechanism;
   b. an arm which connects to said extension;
   c. an attachment means rotatably mounted at the terminus of said arm; and
   d. means by which rotational energy is transmitted to said attachment means.

3. The apparatus of claim 2 wherein the holding mechanism further comprises:
   a. said extension being hollow;
   b. said arm being hollow; and
   c. means for transmitting rotational motion through said hollow extension and hollow arm to said rotatably mounted attachment means.

4. The apparatus of claim 3 wherein the holding mechanism further comprises:
   a. a second arm connected to said extension; and
   b. a rotatably mounted attachment means at the terminus of said second arm.

5. The apparatus of claim 3 wherein the drive means comprises:
   a. means for generating and transferring rotational motion to said extension; and
   b. means for generating and transferring rotational motion to said transmitting means contained within said hollow extension and hollow arm.

6. The apparatus of claim 1 wherein said oven further comprises:
   a. means through which the holding mechanism can be inserted;
   b. means to provide a seal subsequent to insertion of the holding mechanism.

7. The apparatus of claim 6 wherein said means to provide a seal comprises a moveable door with an aperture through which said extension passes.

8. The apparatus of claim 7 which further comprises a cooling means.

9. The apparatus of claim 8 which further comprises:
   a. means for guiding said support structure between said cooling means and said oven.

10. The apparatus of claim 3 wherein said holding mechanism further comprises:
    a. a plurality of arms attached to said extension;
    b. attachment means rotatably mounted at the terminus of each said arm;
    c. means for transmitting rotational motion to at least one of said attachment means.

11. The apparatus of claim 10 wherein said pivot means comprises:
    a. first and second pivots to pivot said support structure, drive means and drive means mount as a single entity.

12. The apparatus of claim 11 wherein said first pivot means pivots said single entity 90° in the vertical plane and said second pivot means pivots and single entity and sequentially rotates 90° in the vertical plane.

13. Apparatus for rotational molding comprising:
    a. truck means;
    b. arm means including first and second sections, each having first and second ends, first pivot means interconnecting said first ends of said first and second sections, and second pivot means interconnecting said second end of said first section to said truck means;
    c. mold receiving means attached at the second end of said second section of said arm means;
    d. power transmitting means carried by arm means and connected to said mold receiving means for applying rotational force to molds received in said mold receiving means; and
    e. means for rotating said arm means between predetermined positions about said pivot means.

14. The apparatus of claim 13 wherein said arm means is hollow and said power transmitting means extends through said hollow arm means.

15. The apparatus of claim 13 which further includes a power source, means for mounting said power source on said truck means, and means for connecting said power transmitting means to said power source.

16. The apparatus of claim 13 which further includes a heating station and a cooling station and means for moving said truck means between said heating and cooling stations.

* * * * *